US010103990B2

(12) United States Patent
McCollum et al.

(10) Patent No.: US 10,103,990 B2
(45) Date of Patent: Oct. 16, 2018

(54) METHOD AND SYSTEM FOR CONGESTION MONITORING IN A DATA NETWORK

(71) Applicant: Openwave Mobility Inc., Redwood City, CA (US)

(72) Inventors: Liam McCollum, Belfast (GB); Matt Halligan, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 176 days.

(21) Appl. No.: 14/930,250

(22) Filed: Nov. 2, 2015

(65) Prior Publication Data

US 2016/0127238 A1    May 5, 2016

(30) Foreign Application Priority Data

Nov. 5, 2014 (GB) .................................. 1419734.7

(51) Int. Cl.
*H04L 12/801* (2013.01)
*H04L 12/825* (2013.01)
(Continued)

(52) U.S. Cl.
CPC ............ *H04L 47/11* (2013.01); *H04L 43/026* (2013.01); *H04L 43/0882* (2013.01); *H04L 47/10* (2013.01); *H04L 47/25* (2013.01); *H04L 47/263* (2013.01); *H04L 41/0896* (2013.01); *H04L 41/5025* (2013.01); *H04L 43/16* (2013.01)

(58) Field of Classification Search
CPC ..... H04L 67/2804; H04L 47/76; H04L 12/14;
H04L 12/66; H04L 29/06; H04L 41/22;
H04L 41/0896; H04L 41/5025; H04L 47/11; H04L 47/10; H04L 47/263;
(Continued)

(56) References Cited

U.S. PATENT DOCUMENTS

| 6,965,943 B1 | 11/2005 | Golestani |
| 2002/0105911 A1* | 8/2002 | Pruthi ..................... H04L 41/22 370/241 |

(Continued)

FOREIGN PATENT DOCUMENTS

| EP | 1973271 A1 | 9/2008 |
| EP | 2472946 A1 | 7/2012 |

(Continued)

OTHER PUBLICATIONS

Seong-Lyong Gong et al. "Cross Layer and End to End Optimization for the Integrated Wireless and Wireline Network" Journal of Com munications and Networks, vol. 14, No. 5, pp. 554-565,Jan. 10, 2012 XP011473065.

(Continued)

*Primary Examiner* — Le H Luu
(74) *Attorney, Agent, or Firm* — EIP US LLP

(57) ABSTRACT

A method, system and computer program for congestion monitoring in a data network. The method comprises: determining, at a server in the data network, that a user device has initiated a data session with the data network; monitoring, at the server, a plurality of data flows associated with the data session to determine an average bandwidth of the plurality of data flows; and determining a congestion status of the data session based on the average bandwidth and one or more criteria.

19 Claims, 12 Drawing Sheets

(51) Int. Cl.
*H04L 12/26* (2006.01)
*H04L 12/24* (2006.01)

(58) Field of Classification Search
CPC ... H04L 47/25; H04L 43/0882; H04L 43/026; H04L 43/16
See application file for complete search history.

(56) References Cited

U.S. PATENT DOCUMENTS

| | | |
|---|---|---|
| 2004/0016000 A1 | 1/2004 | Zhang |
| 2007/0094712 A1 | 4/2007 | Gibbs et al. |
| 2008/0002670 A1* | 1/2008 | Bugenhagen ............ H04L 12/66 370/352 |
| 2008/0195748 A1* | 8/2008 | Tierney .................... H04L 29/06 709/232 |
| 2012/0215911 A1* | 8/2012 | Raleigh .................... H04L 12/14 709/224 |
| 2014/0140213 A1* | 5/2014 | Raleigh ............... H04L 67/2804 370/235 |
| 2014/0341026 A1* | 11/2014 | Gahm ..................... H04L 47/76 370/232 |

FOREIGN PATENT DOCUMENTS

| | | |
|---|---|---|
| EP | 2530885 A1 | 12/2012 |
| WO | 2012164239 A1 | 12/2012 |
| WO | 2013181654 A1 | 12/2013 |

OTHER PUBLICATIONS

EP Exam Report dated Jun. 18, 2018 for EP Application No. 15192816.5.

* cited by examiner

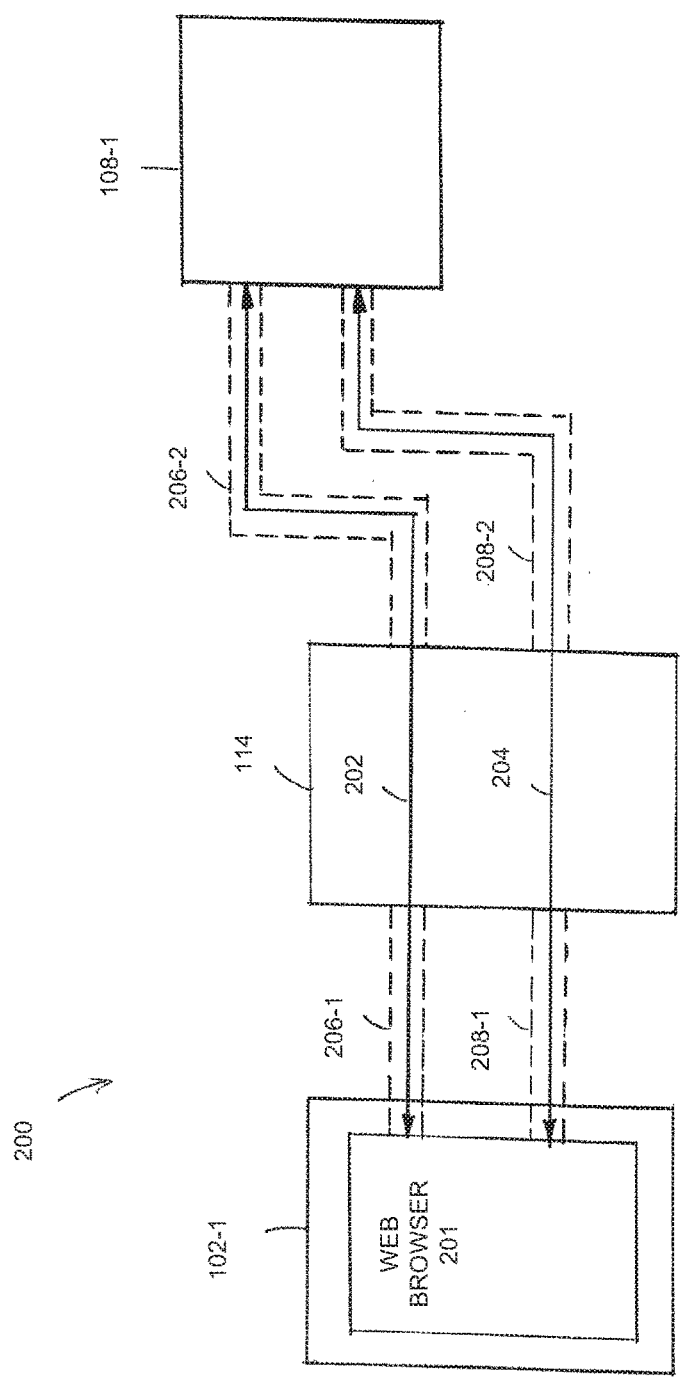

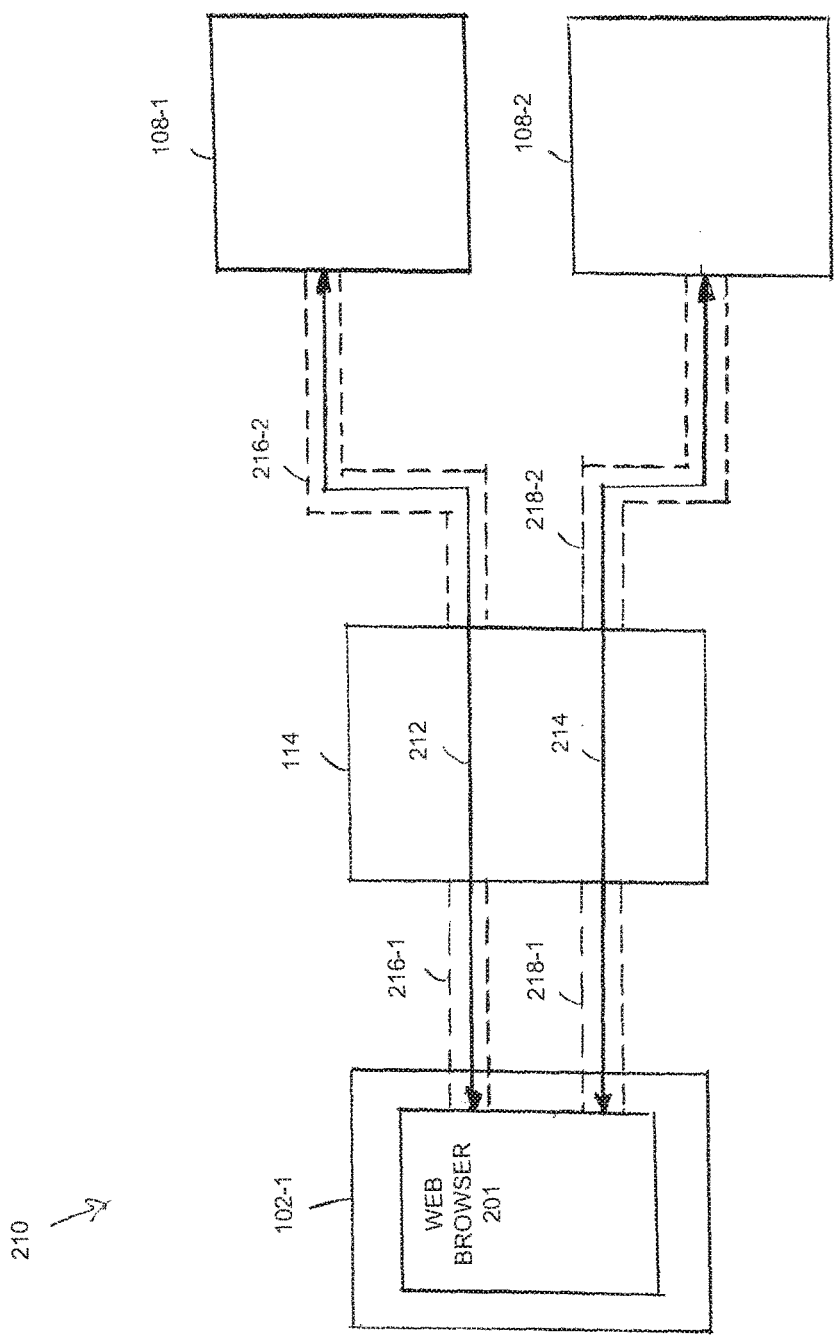

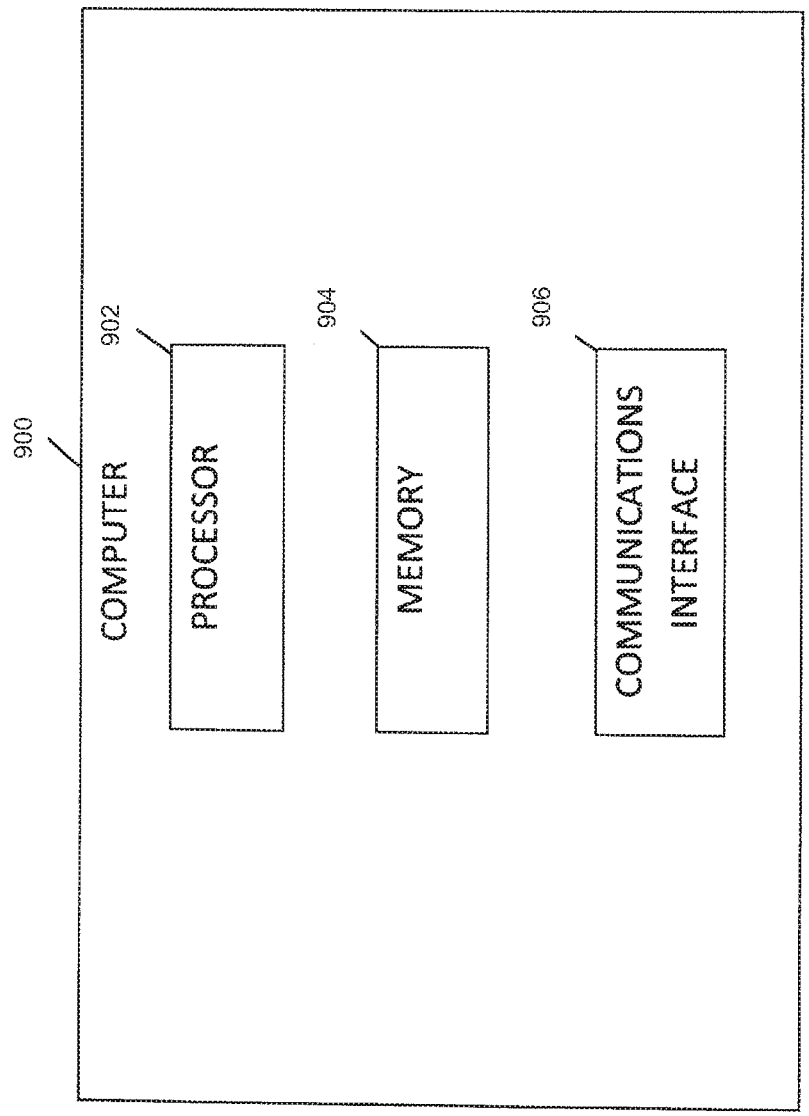

METHOD AND SYSTEM FOR CONGESTION MONITORING IN A DATA NETWORK

CROSS-REFERENCE TO RELATED APPLICATIONS

This application claims priority under 35 U.S.C. § 119(a) to United Kingdom Application No. GB 1419734.7, filed Nov. 5, 2014, the entire contents of which are hereby incorporated by reference.

BACKGROUND OF THE INVENTION

Field of the Invention

The present application relates to detection of congestion in a data network. In particular, the present application relates to detection of congestion in a data session in respect of the data network.

Description of the Related Technology

Conventional techniques for detecting congestion in a data network require integration of dedicated network components, such as congestion probes, usage analysers, and deep packet inspectors. However, integration of these dedicated network components tends to be costly, non-standard and complex. For example, according to conventional techniques, it is often necessary to create and integrate one or more "touch points" into the data network in order to facilitate congestion monitoring. These "touch points" can cause complexities for deployment of a network infrastructure, in particular in the case of a radio access network.

SUMMARY

A first aspect provides a method for congestion monitoring in a data network, the method comprising: determining, at a server in the data network, that a user device has initiated a data session with the data network; monitoring, at the server, a plurality of data flows associated with the data session to determine an average bandwidth of the plurality of data flows; and determining a first congestion status of the data session based on the average bandwidth and one or more first criteria.

According to some embodiments, the one or more first criteria comprise a first threshold level and a first time period, and the first congestion status determined for the data session indicates that the data session is congested when the average bandwidth is below the first threshold level for longer than the first time period.

According to some embodiments, the data session is an Internet Protocol (IP) data session.

According to some embodiments, the server is a proxy server located in a data path between the user device and a plurality of content sources.

According to some embodiments, the plurality of data flows comprises a first data flow and a second data flow, the first data flow comprising first data transmitted between the user device and a first endpoint associated with the plurality of content sources, and the second data flow comprising second data transmitted between the user device and a second endpoint associated with the plurality of content sources.

According to some embodiments, the first data is transmitted using the Transmission Control Protocol (TCP), and the first endpoint is a first network socket associated with a first TCP connection over which the first data is transmitted.

According to some embodiments, the second data is transmitted using the Transmission Control Protocol (TCP), and the second endpoint is a network socket associated with a second TCP connection over which the second data is transmitted.

According to some embodiments, the first endpoint is associated with a first content source in the plurality of content sources, and the second endpoint is associated with a second content source in the plurality of content sources, different from the first content source.

According to some embodiments, the plurality of data flows comprises a first data flow and a second data flow, the first data flow comprising first data addressed to a first network socket associated with the user device, and the second data flow comprising second data addressed to a second network socket associated with the user device, wherein the first network socket is different from the second network socket.

According to some embodiments, the plurality of data flows is associated with a plurality of buffers and monitoring the plurality of data flows associated with the data session includes monitoring the rate at which data is written to each of the plurality of buffers.

According to some embodiments, the method comprises modifying a characteristic of at least one data flow in the plurality of data flows when the first congestion status determined for the data session indicates that the data session is congested.

According to some embodiments, the characteristic of the at least one data flow in the plurality of data flows is modified in accordance with a policy associated with the user device.

According to some embodiments, the policy is an access control policy and/or a rate shaping policy associated with the user device.

According to some embodiments, the characteristic of the at least one data flow in the plurality of data flows is modified by changing optimisation process applied to the at least one data flow.

According to some embodiments, the characteristic of the at least one data flow in the plurality of data flows is modified by changing a traffic shaping process applied to the at least one data flow.

According to some embodiments, determining, that a user device has initiated a data session with the data network is based, at least in part, on a message received at the server.

According to some embodiments, the message is a Remote Authentication Dial-In User Service (RADIUS) message received from an Authentication, Authorization, and Accounting (AAA) server.

According to some embodiments, the method comprises determining a second congestion status of the data session based on the average bandwidth and one of more second criteria.

According to some embodiments, the one or more second criteria comprise a second threshold level and a second time period, and the second congestion status determined for the data session indicates that the data session is no longer congested when the average bandwidth is above the second threshold level for longer than the second time period.

According to some embodiments, the method comprises modifying a characteristic of at least one data flow in the plurality of data flows when the second congestion status determined for the data session indicates that the data session is no longer congested.

A second aspect provides a system for congestion monitoring in a data network, the system comprising at least one memory including computer program code; and at least one processor in data communication with the at least one memory, wherein the at least one processor is configured to, at a server in the data network: determine that a user device has initiated a data session with the data network; monitor a plurality of data flows associated with the data session to determine an average bandwidth of the plurality of data flows; and determine a first congestion status of the data session based on the average bandwidth and one or more first criteria.

A third aspect provides a non-transitory computer-readable storage medium comprising computer-executable instructions which, when executed by a processor, cause a computing device to perform a method of congestion monitoring in a data network, the method comprising: determining, at a server in the data network, that a user device has initiated a data session with the data network; monitoring, at the server, a plurality of data flows associated with the data session to determine an average bandwidth of the plurality of data flows; and determining a first congestion status of the data session based on the average bandwidth and one or more first criteria.

BRIEF DESCRIPTION OF THE DRAWINGS

Further features and advantages of the invention will become apparent from the following description of certain embodiments of the invention, given by way of example only, which is made with reference to the accompanying drawings.

FIGS. 2A-D are schematic diagrams showing a plurality of data session in accordance with an embodiment.

FIG. 9 is a schematic diagrams showing a computing device for implementing a method of detecting congestion in a data session according to an embodiment.

DETAILED DESCRIPTION OF CERTAIN INVENTIVE EMBODIMENTS

Figure 1:
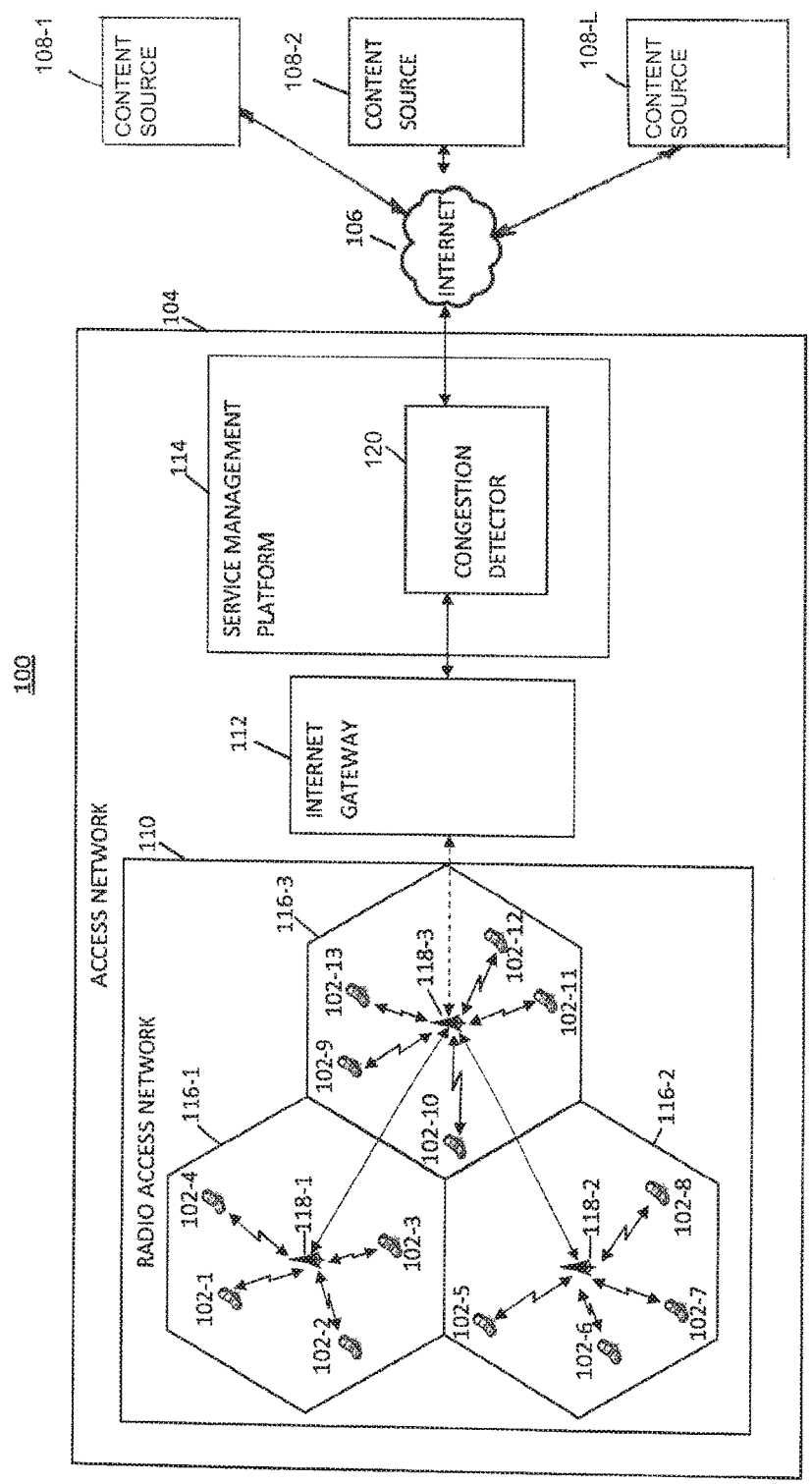
FIG. 1 is a schematic diagram showing a content delivery system in accordance with an embodiment.

It will be readily understood that the components of the embodiments as generally described herein and illustrated in the appended drawings could be arranged and designed in a wide variety of different configurations. Thus, the following description of various embodiments, as represented in the drawings, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this description to features, advantages, or similar language does not imply that all of the features and advantages that may be realized in any single embodiment. Rather, language referring to the features and advantages is understood to mean that a specific feature, advantage, or characteristic described in connection with an embodiment is included in at least one embodiment. Thus, discussions of the features and advantages, and similar language, throughout this description may, but do not necessarily, refer to the same embodiment.

Furthermore, the described features, advantages, and characteristics may be combined in any suitable manner in one or more embodiments. One skilled in the relevant art will recognize, in light of the description herein, that embodiments can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

FIG. 1 depicts a schematic block diagram of a content delivery system 100 in accordance with an embodiment. The content delivery system 100 includes wireless devices 102-1 . . . 102-N, an access network 104, a data network such as the Internet 106, and a plurality of content sources 108-1 . . . 108-L, where N and L are positive integers. Although the content delivery system 100 is depicted and described with certain components and functionality, other embodiments of the content delivery system 100 may include fewer or more components to implement less or more functionality. For example, the content delivery system 100 may include any number of wireless devices, access networks, and/or content sources.

Each of the wireless devices 102-1 . . . 102-N of the content delivery system 100 is configured to request content, for example, from the one or more of the content sources 108-1 . . . 108-L, on behalf of at least one end-user, and to render received content for presenting to the end-user. The end-user may be a single person, multiple persons, other entity or entities. The content may be any type of content. For example, the content may include data associated with one or more webpage files, one or more text files, one or more image files, one or more audio files, or one or more video files, or any combination thereof. In an embodiment, the content is a media stream, such as a video stream, which is time sensitive media content that is received by and presented to an end-user while being delivered by one or more of the content sources 108-1 . . . 108-L. Although the content delivery system is shown in FIG. 1 as including wireless devices 102-1 . . . 102-N, in other embodiments, the content delivery system includes at least one end-user device that communicates through wires or communicates wirelessly and through wires with other entity or entities.

Although the wireless devices 102-1 . . . 102-N are shown in FIG. 1 as cell phones, the wireless devices can be any type of devices that communicate using electromagnetic communications signals. Each wireless device 102-1 . . . 102-N of the content delivery system 100 can support one or more different radio frequency (RF) communications protocols, including without limitation, Global System for Mobile communications (GSM), Universal Mobile Telecommunications System (UMTS®), Code Division Multiple Access (CDMA), Worldwide Interoperability for Microwave Access (WiMAX®) and communications protocols as defined by the 3rd Generation Partnership Project (3GPP®) or the 3rd Generation Partnership Project 2 (3GPP2), 4G Long Term Evolution (LTE) and Institute of Electrical and Electronics Engineers (IEEE®) standards bodies. Although some wireless communications protocols are identified herein, it should be understood that the present disclosure is not limited to the cited wireless communications protocols. In an embodiment, at least one of the wireless devices 102-1 . . . 102-N of the content delivery system 100 is a handheld wireless device, such as a cell phone, a mobile phone, a smartphone, a pad computer, a Personal Digital Assistant (PDA), a handheld gaming device etc., which can wirelessly communicate using electromagnetic communications signals, such as RF communications signals.

The access network 104 of the content delivery system 100 is configured to facilitate wireless communications between the wireless devices 102-1 . . . 102-N and the data network 106 and/or the content sources 108-1 . . . 108-L. In the embodiment depicted in FIG. 1, the access network 104 includes a radio access network 110, an Internet gateway 112 and a service management platform 114. The access network 104 may be a wireless service provider network (e.g. a service provider that offers 3G, 4G and/or Wi-Fi® access) or an Internet Service Provider (ISP) (e.g., a service provide that offers dial-up, DSL, and/or cable modem access). The access network 104 may be a private enterprise network if client devices within the private enterprise network can access the Internet through the private enterprise network. The access network 104 may be owned, managed, and/or administered by a single entity or different entities. For example, the access network may be owned, managed, and/or administered by an ISP, a single wireless service provider, or a private enterprise. Although the access network 104 is depicted and described with certain components and functionality, other embodiments of the access network 104 may include fewer or more components to implement less or more functionality. For example, the access network 104 may include multiple radio access networks, multiple Internet gateways and/or multiple service management platforms. In another example, the access network 104 includes a data gateway to configure outgoing data access requests for use with one or more networks and incoming data for use by or display on the wireless devices 102-1 . . . 102-N. The data gateway can provide authentication and data formatting functions and/or enable users of wireless devices to roam between radio access network cells.

The radio access network 110 of the access network 104 is configured to facilitate radio communications between the wireless devices 102-1 . . . 102-N within the radio access network 110 and between wireless devices in other radio access networks, and provides interfaces to facilitate communications with other entities, such as a Public Switched Telephone Network (PSTN), a Wide Area Network (WAN), the data network 106, and Internet servers, hosts, etc., which are outside of the radio access network 110. The radio access network 110 offers wireless access, such as 3G, 4G and/or Wi-Fi access, to the wireless devices 102-1 . . . 102-N. Data signals communicated between the wireless devices 102-1 . . . 102-N and the radio access network 110 include, but are not limited to, analogue and/or digital RF signals (i.e., radio waves) for any type of communications mode, including text messaging, multimedia messaging, voice calling, and Internet browsing. The radio access network 110 can support various different RF communications protocols, including without limitation, GSM, UMTS, CDMA, WiMAX and communications protocols as defined by 3GPP, 3GPP2, or IEEE 802.16. Although some wireless communications protocols are identified herein, it should be understood that the supported protocols of the radio access network are not limited to the cited wireless communications protocols.

In the embodiment depicted in FIG. 1, the radio access network 110 includes radio access network cells 116-1 . . . 116-M, where M is a positive integer. Each of the radio access network cells 116-1 . . . 116-M includes one of base stations 118-1 . . . 118-M to facilitate communications involving a wireless device or wireless devices 102-1 . . . 102-N that is within a communications range of the base station. In addition, each of the base stations 118-1 . . . 118-M can provide interfaces to facilitate communications with other entities, such as a PSTN, a WAN, the data network 106, Internet servers, hosts, etc. outside of the radio access network 110. As shown in FIG. 1, wireless devices 102-1-102-4 are located within the communications range of the base station 118-1 of the radio access network cell 116-1, wireless devices 102-5-102-8 are located within the communications range of the base station 118-2 of the radio access network cell 116-2, and wireless devices 102-9-102-13 are located within the communications range of the base station 118-3 of the radio access network cell 116-3. The base stations 118-1 . . . 118-M may be connected to each other through wires, such as fibre optic cables, and/or connected to each other wirelessly to communicate with each other. The base stations 118-1 . . . 118-M may be connected to an entity that is outside the radio access network 110 (e.g. Internet gateway 112) through wires, such as fibre optic cables, and/or connected wirelessly to communicate with an entity that is outside the radio access network 110. In the embodiment depicted in FIG. 1, the base station 118-1 and the base station 118-2 are connected, through wires, to the base station 118-3, which is connected directly to the Internet gateway 112 or connected to the Internet gateway 112 through one or more intermediate devices (not shown).

In an embodiment, each of the base stations 118-1 . . . 118-M includes one or more signalling tower stations. Each signalling tower station may be a base transmission station (BTS), Node B or other equivalent component and may include an antenna tower and electronic components to receive and transmit wireless signals. Each signalling tower station may include a base station controller (BSC), a radio network controller (RNC) or other equivalent component. In an embodiment, the radio access network includes one or more mobile switching devices, which may be mobile switching centres (MSCs) or other equivalent components. For example, the mobile switching devices connect the base stations 118-1 . . . 118-M to the Internet gateway 112.

Although the radio access network 110 is shown in FIG. 1 as including multiple radio access network cells 116-1 . . . 116-M, in other embodiments, the radio access network may include one radio access network cell. In addition, although each radio access network cell of the radio access network is shown in FIG. 1 as including one of the base station 118-1 ... 118-M, in other embodiments, at least one of the radio access network cells may include multiple base stations. Furthermore, although the radio access network cells of the radio access network is shown in FIG. 1 as not being overlapped, in other embodiments, at least some of the radio access network cells are overlapped. Additionally, although each radio access network cell of the radio access network 116 is shown in FIG. 1 as having a hexagonal shape, in other embodiments, at least one of the radio access network cells have a circular shape or other non-hexagon shape.

The Internet gateway 112 of the access network 104 provides a gateway for communications between the wireless devices 102-1 ... 102-N and Internet-connected hosts and/or servers in the Internet 106, which can also be referred to as "the cloud". In some embodiments, the Internet gateway 112 functions as an Internet Protocol (IP) Connectivity Access Network (IP-CAN) to provide IP transport connectivity between the wireless devices 102-1 ... 102-N and the Internet 106. In this context, the Internet gateway 112 is representative of a collection of network entities and interfaces which provide IP connectivity to the wireless devices 102-1 ... 102-N. For example, the Internet gateway 112 may include one or more of a Serving General Packet Radio Service (GPRS) Support Node (SGSN) and/or a Gateway GPRS Support Node (GGSN). In further embodiments, the Internet gateway 112 may be a Wireless Application Protocol (WAP) gateway that converts the WAP protocol used by the radio access network to the HTTP protocol used by the Internet 106. In an embodiment, the Internet gateway 112 enables wireless devices to access multimedia content, such as Hyper Text Markup Language (HTML), compact HTML (cHTML), and extensible HTML (xHTML), which is stored on Internet-connected hosts and/or servers. The Internet gateway 112 may be directly or indirectly connected to the radio access network 110.

The service management platform 114 of the access network 104 is located in the data path between the wireless devices 102-1 ... 102-N and the content sources 108-1 ... 108-L. The service management platform 114 is an appliance configured to monitor data sessions associated with the wireless devices 102-1-102-N, and to provide services for the radio access network 110, which can improve user experience and/or increases network throughput of the radio access network 110. In an embodiment, the service management platform 114 is a proxy server, such as an HTTP proxy server that handles HTTP traffic. In the embodiment depicted in FIG. 1, the service management platform 114 includes a congestion detector 120 configured to determine the congestion status or congestion conditions of data sessions associated with the wireless devices 102-1-102-N.

The detected congestion conditions for data sessions associated with the wireless devices 102-1-102-N of the radio access network 110 allow a network operator of the radio access network 110 using, for example, the service management platform 114, to control or orchestrate various service features, such as, in order to improve user experience and/or increase network throughput. The network operator can act to relieve or alleviate the congestion for a given data session to improve user experience and/or increase network throughput. In an embodiment, the network operator may limit bit rates of transactions or data flows associated with a congested data session, for example, via the service management platform 114, or contact the user of the wireless device to suggest subscription upgrades.

The service management platform 114 handles data traffic on the user plane, i.e., real user traffic such as browsing, video downloads and peer-to-peer traffic etc. In an embodiment, the service management platform 114 can manage a subscriber policy, such as an access control policy or a rate shaping policy, which influences traffic treatment for the subscribers. The subscriber policy can be calibrated based on aspects such as subscription level (e.g. gold/silver/platinum service), the characteristics of traffic (e.g. the destination URL or IP) and roaming behaviour of a subscriber. For example, with the availability of the congestion conditions of a data session associated with the subscriber, the subscriber policy can be further calibrated to ensure that a minimum quality of service level is maintained for the subscriber. As a result, the traffic treatment for the subscribers can be conducted in view of the subscribers' real time congestion conditions, which can improve user experience and/or increase network throughput.

The congestion detector 120 is located in the data path between the wireless devices 102-1 ... 102-N and the content sources 108-1 ... 108-L. Compared to the conventional congestion mechanisms, using the congestion detector 120 to detect congestion conditions of the radio access network is done by measuring how real user data is being transmitted to a subscriber. Thus, the dedicated network components that tend to be costly, non-standard and complex to integrate into a carrier network are no longer needed. For example, the "touch points" required in the conventional congestion mechanisms for integrating dedicated network components into a carrier network are no longer needed. Thus, compared to the conventional congestion mechanisms, using the congestion detector 120 to detect congestion conditions of the radio access network is more cost effective and easier to implement.

The service management platform 114 and the congestion detector 120 can be deployed in various locations of the content delivery system 100. Although the service management platform 114 and the congestion detector 120 are shown in FIG. 1 as being a part of the access network 104, the service management platform 114 and/or the congestion detector 120 may be external to the access network 104 in other embodiments. In addition, although the service management platform 114 and the congestion detector 120 are shown in FIG. 1 as being located outside the radio access network 110, the service management platform 114 and/or the congestion detector 120 may be integrated into the radio access network 110 in other embodiments. Furthermore, although the service management platform 114 and the congestion detector 120 is shown in FIG. 1 as being located between the Internet gateway 112 and the data network 106, the service management platform 114 and/or the congestion detector 120 can be located anywhere within the content delivery system 100. In an embodiment, the service management platform 114 and/or the congestion detector 120 are located anywhere in the data path between the wireless devices 102-1 ... 102-N and the content sources 108-1 ... 108-L. For example, the service management platform 114 and/or the congestion detector 120 may be located between the radio access network 116 and the Internet gateway 112 or between the Internet 106 and the content sources 108-1 ... 108-L. Additionally, the service management platform 114 and/or the congestion detector 120 can be integrated in a single device or distributed among multiple devices. For example, the service management platform 114 and/or the congestion detector 120 may be integrated within the Internet gateway 112, and/or one of the content sources 108-1 . . . 108-L. In an embodiment, the service management platform 114 and/or the congestion detector 120 are located in one of the base stations 118-1 . . . 118-M or a data centre in the radio access network 110 of a wireless carrier such as a cellular communications carrier. In another embodiment, the service management platform 114 and/or the congestion detector 120 are integrated within the Internet gateway 112 of a wireless carrier such as a cellular communications carrier. Furthermore, the service management platform 114 and/or the congestion detector 120 are distributed in different networks. For example, a part of the service management platform 114 and/or the congestion detector 120 may be located in a public network such as the Internet 106 while the rest of the service management platform 114 and/or the congestion detector 120 is located in a private network.

The content sources 108-1 . . . 108-L of the content delivery system 100 are configured to store content and to process requests for content from the wireless devices 102-1 . . . 102-N. The content sources 108-1 . . . 108-L may, for example, store video content and/or non-video content such as text files, webpage files, image files, audio files, or any combination thereof. The content stored in the content sources 108-1 . . . 108-L may be encoded or not encoded and compressed or uncompressed. The content sources 108-1 . . . 108-L may serve content over a single transport layer protocol or multiple transport layer protocols. The content sources 108-1 . . . 108-L may be distributed among different devices in a network.

As discussed above, the service management platform 114 is configured to manage data sessions associated with a wireless devices 102-1 . . . 102-N and in respect of the Internet 106. In this context, a data session is a data exchange between a wireless device and one or more of the content sources 108-1 . . . 108-L in the Internet 106. For example, a data session may be an IP-CAN session initiated by and maintained by the Internet gateway 112, as discussed above. The data exchange typically includes a plurality of "distinct" data flows between a wireless device 102-1 . . . 102-N and the content sources 108-1 . . . 108-L, which pass through the service management platform 114, acting as a proxy for communications between the wireless devices 102-1 . . . 102-N and the content sources 108-1 . . . 108-L. In this context, each data flow in the data session is associated with an "end-to-end" exchange of data between a wireless device and a content source. The exchange of data associated with a data flow is typically facilitated by a transport layer protocol, such as the Transmission Control Protocol (TCP) or the User Datagram Protocol (UDP) and comprises on or more "discrete" transactions. In other words, the data associated with a data flow is transmitted between two endpoint points: a client-side endpoint associated with the wireless device, and a server-side endpoint associated with the content source. Thus, a data flow may be defined as the flow of data between a particular pair or combination of client-side and server-side endpoints. In this context, the endpoints may, for example, be a network socket with an associated socket address (e.g. IP address and port number).

In a typical example, a data flow may comprises a plurality of Hypertext Transfer Protocol (HTTP) transactions which are carried over the TCP transport layer protocol. In this example, the HTTP transaction may include a plurality of HTTP Request and corresponding HTTP Response messages, which are transported in a plurality of TCP packets between a wireless device 102-1 . . . 102-N, the Internet gateway 112, the service management platform 114 and the content source in question 108-1 . . . 108-L. In a further example, a data flow may comprise a media stream (e.g. an audio or audio-visual stream) carried over the UDP transport layer protocol. In this example the media stream may be streamed according to the Real Time Streaming Protocol (RTSP) and transported in a plurality of UDP packets between the wireless device 102-1 . . . 102-N, the Internet gateway 112, the service management platform 114 and the content source 108-1 . . . 108-L in question.

FIG. 2A shows a first example of a data session 200 involving a wireless device 102-1 and a content source 108-1, and monitored by the service management platform 114. The data session 200 is associated with a web browser 201 running on the wireless device 102-1 which accesses a Web content hosted by the content source 108-1. In this example, the data session 200 includes two distinct data flows between the Web browser 201 running on wireless device 102-1 and the content source 108-1. Specifically, the two data flows correspond a first HTTP session 202 and a second HTTP session 204 which have been initiated by the web browser 201 to retrieve web content from the content source 108-1. The first HTTP session 202 is carried over a first TCP connection 206-1 between the wireless device 102-1 and the service management platform 114, and a second TCP connection 206-2 between the service management platform 114 and the content source 108-1. In a similar manner, the second HTTP session 204 is carried over a third TCP connection 208-1 between the wireless device 102-1 and the service management platform 114, and a fourth TCP connection 208-2 between the service management platform 114 and the content source 108-1. In this context, the first and second HTTP sessions typically include one or more HTTP transactions. For example, one or both of the first and second HTTP connection may be a persistent HTTP connection, according to which a plurality of HTTP transaction are "carried" over a single TCP connection.

In FIG. 2A, the first and second data flows 202, 204 are uniquely defined by their respective combinations of client-side and server-side endpoints. Specifically, the first data flow 202 is associated with a first client-side network socket opened by the web browser 201 and a first server-side network socket opened by the content source 108-1. Similarly, the second data flow 204 is associated with a second client-side network socket opened by the web browser 201 and a second server-side network socket opened by the content source 108-1. In a typical example, the first and second client-side network sockets may be different but the first and second server-side sockets may be the same. Thus, in this example the first and second data flows are uniquely defined by their respective combination of client-side and server-side network sockets. In some embodiments, the first and second data flows may be further defined by the associated transport layer protocol, in addition to the client-side and server-side network sockets, resulting in a "5-tuple" definition.

FIG. 2B shows a second example of a data session 210 involving wireless device 102-1 and two content sources 108-1, 108-2, and monitored by the service management platform 114. The data session 210 is associated with web browser 201 running on the wireless device 102-1 which accesses web content hosted by the two separate content sources 108-1, 108-2. In this example, the data session 210 includes two distinct data flows between the web browser 201 running on wireless device 102-1 and the respective content sources 108-1, 108-2. Specifically, the two data flows include a first HTTP session 212 initiated by the web browser to retrieve a web content from the first content source 108-1, and a second HTTP session 214 initiated by the web browser to retrieve web content from the second content source 108-2. The first HTTP session 212 is carried over a first TCP connection 216-1 between the wireless device 102-1 and the service management platform 114, and a second TCP connection 216-2 between the service management platform 114 and the first content source 108-1. In a similar manner, the second HTTP session 214 is carried over a third TCP connection 218-1 between the wireless device 102-1 and the service management platform 114, and a fourth TCP connection 218-2 between the service management platform 114 and the second content source 108-2.

In FIG. 2B, the first and second data flows 212, 214 are uniquely defined by their respective combinations of client-side and server-side endpoints. Specifically, the first data flow 212 is associated with a first client-side network socket opened by the web browser 201 and a first server-side network socket opened by the first content source 108-1. Similarly, the second data flow 214 is associated with a second client-side network socket opened by the web browser 201 and a second server-side network socket opened by the second content source 108-2. Thus, in this example the first and second data flows are uniquely defined by their respective combination of client-side and server-side network sockets. As discussed above, according to some embodiments, the first and second data flows may be further defined by the associated transport layer protocol, in addition to the client-side and server-side network sockets, resulting in a "5-tuple" definition.

Figure 2C:
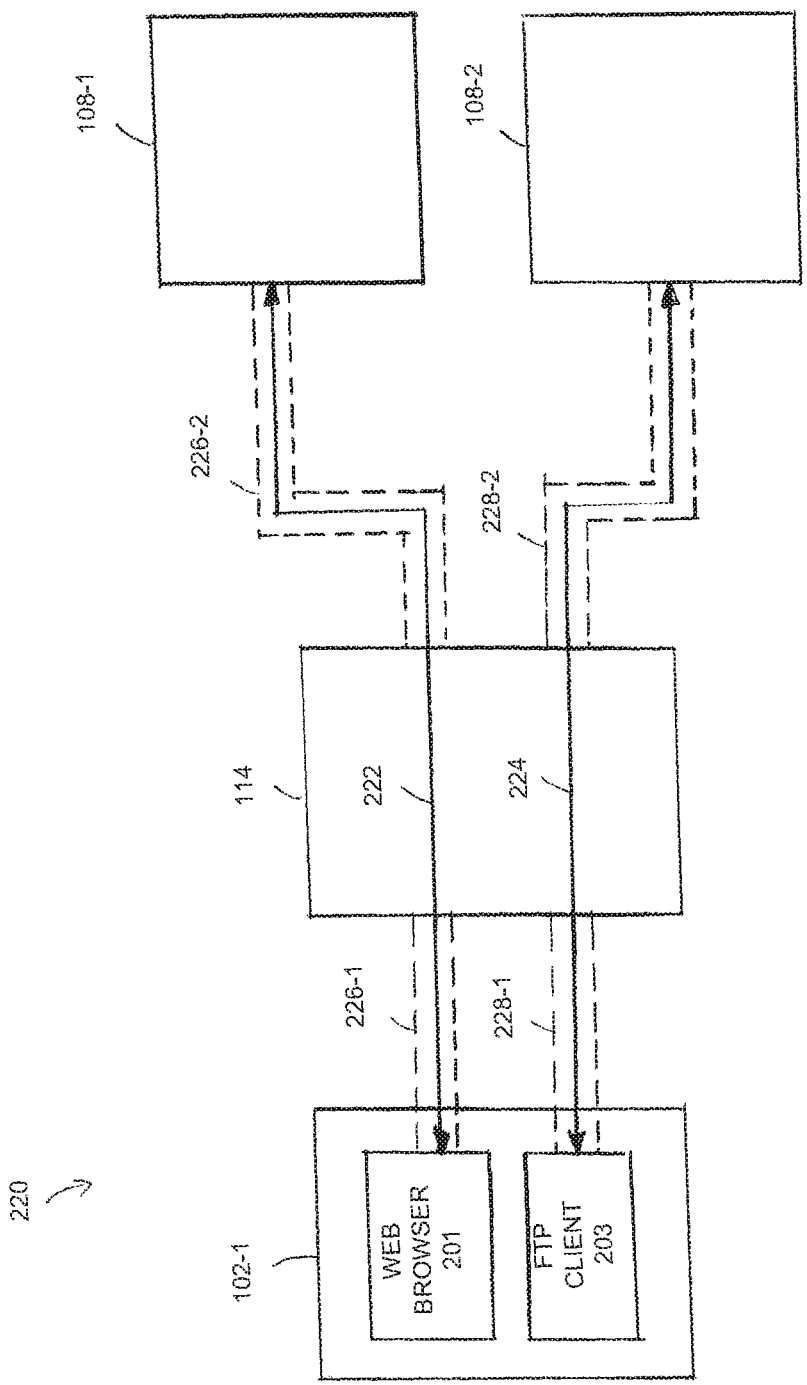

FIG. 2C shows a third example of a data session 220 involving wireless device 102-1 and content sources 108-1, 108-2, and monitored by the service management platform 114. The data session 220 is associated with web browser 201 and a File Transfer Protocol (FTP) client 203 running on the wireless device 102-1. In this example, the web browser 201 and the FTP client 203 access content hosted by two separate content sources 108-1, 108-2 respectively. In this example, the first content source 108-1 is a web server and the second content source 108-2 is an FTP server. The data session 220 includes a first distinct data flow between the Web browser 201 running on wireless device 102-1 and the content source 108-1, and a second discrete data flow between the FTP client 203 running on the wireless device 102-1 and content source 108-2. The first data flow is an HTTP session 222 initiated by the web browser 201 to retrieve web content from the first content source 108-1, and the second data flow is an FTP session 224 initiated by the FTP client to retrieve one or more files from the second content source 108-2. The HTTP session 222 is carried over a first TCP connection 226-1 between the wireless device 102-1 and the service management platform 114, and a second TCP connection 226-2 between the service management platform 114 and the first content source 108-1. In a similar manner, the FTP session is carried over a third TCP connection 228-1 between the wireless device 102-1 and the service management platform 114, and a fourth TCP connection 228-2 between the service management platform 114 and the second content source 108-2.

In FIG. 2C, the first and second data flows 222, 224 are uniquely defined by their respective combinations of client-side and server-side endpoints. Specifically, the first data flow 222 is associated with a first client-side network socket opened by the web browser 201 and a first server-side network socket opened by the first content source 108-1. Similarly, the second data flow 224 is associated with a second client-side network socket opened by the FTP client 203 and a second server-side network socket opened by the second content source 108-2. Thus, in this example the first and second data flows are uniquely defined by their respective combination of client-side and server-side network sockets. As discussed above, according to some embodiments, the first and second data flows may be further defined by the associated transport layer protocol, in addition to the client-side and server-side network sockets, resulting in a "5-tuple" definition.

Figure 2D:
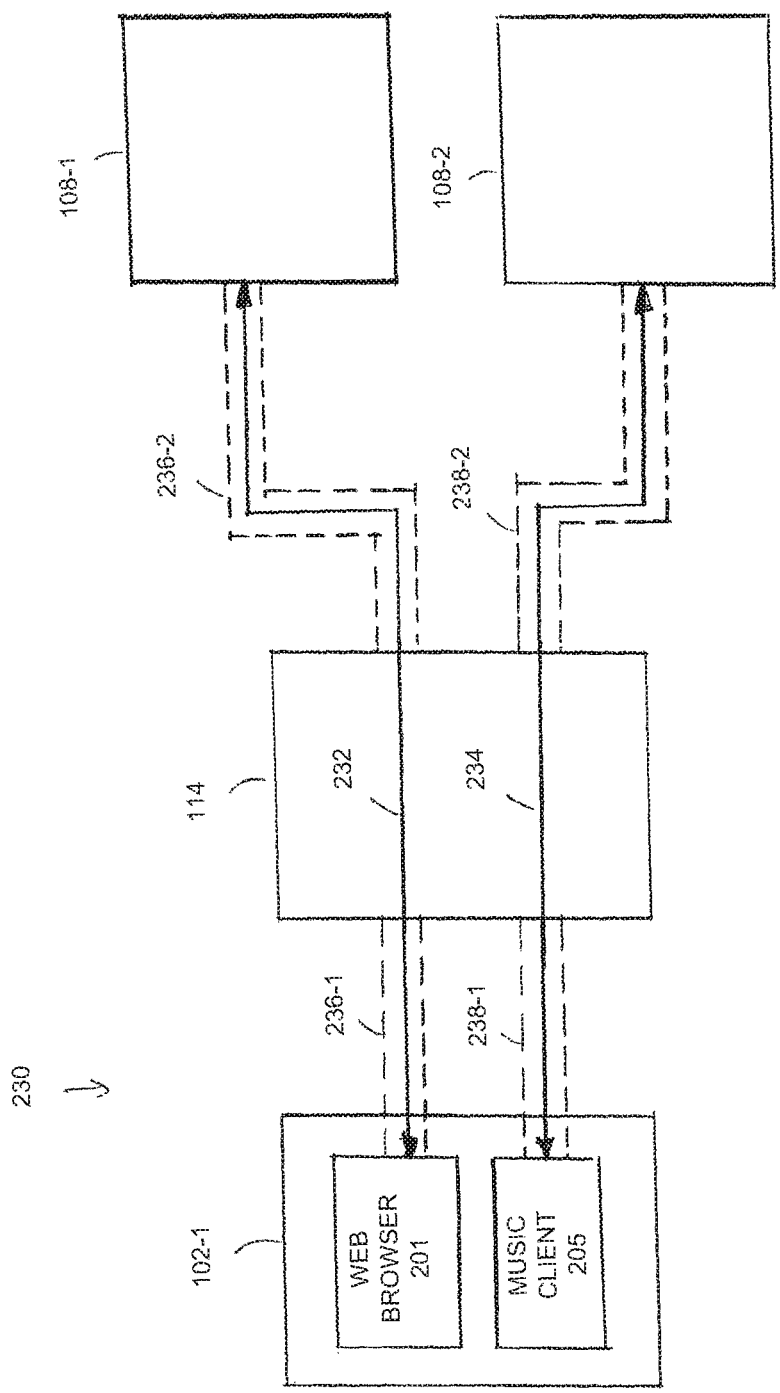

FIG. 2D shows a fourth example of data session 230 involving wireless device 102-1 and two content sources 108-1, 108-2, and monitored by the service management platform 114. Data session 230 is associated with web browser 201 and a music client 205 running on the wireless device 102-1 which access content hosted by the two separate content sources 108-1, 108-2. In this example, the first content source 108-1 is a web server and the second content source 108-2 is a media server providing streamed audio. Thus, the data session 230 includes a first discreet data flow between the web browser 201 running on wireless device 102-1 and the content source 108-1, and a second discrete data flow between the music client 205 running on the wireless device 102-1 and content source 108-2. The first data flow is an HTTP session 232 initiated by the web browser 201 to retrieve a web content from the first content source 108-1, and the second data flow is an RTSP session 234 initiated by the music client to stream one or more music files from the second content source 108-2. The HTTP session 232 is carried over a first TCP connection 236-1 between the wireless device 102-1 and the service management platform 114, and a second TCP connection 236-2 between the service management platform 114 and the first content source 108-1. In a similar manner, the RTSP session is carried over a first UDP session 238-1 between the wireless device 102-1 and the service management platform 114, and a second UDP session 238-2 between the service management platform 114 and the second content source 108-2.

In FIG. 2D, the first and second data flows 232, 234 are uniquely defined by their respective combinations of client-side and server-side endpoints. Specifically, the first data flow 232 is associated with a first client-side network socket opened by the web browser 201 and a first server-side network socket opened by the first content source 108-1. Similarly, the second data flow 234 is associated with a second client-side network socket opened by the music client 205 and a second server-side network socket opened by the second content source 108-2. Thus, in this example the first and second data flows are uniquely defined by their respective combination of client-side and server-side network sockets. As discussed above, according to some embodiments, the first and second data flows may be further defined by the associated transport layer protocol, in addition to the client-side and server-side network sockets, resulting in a "5-tuple" definition.

Figure 3:
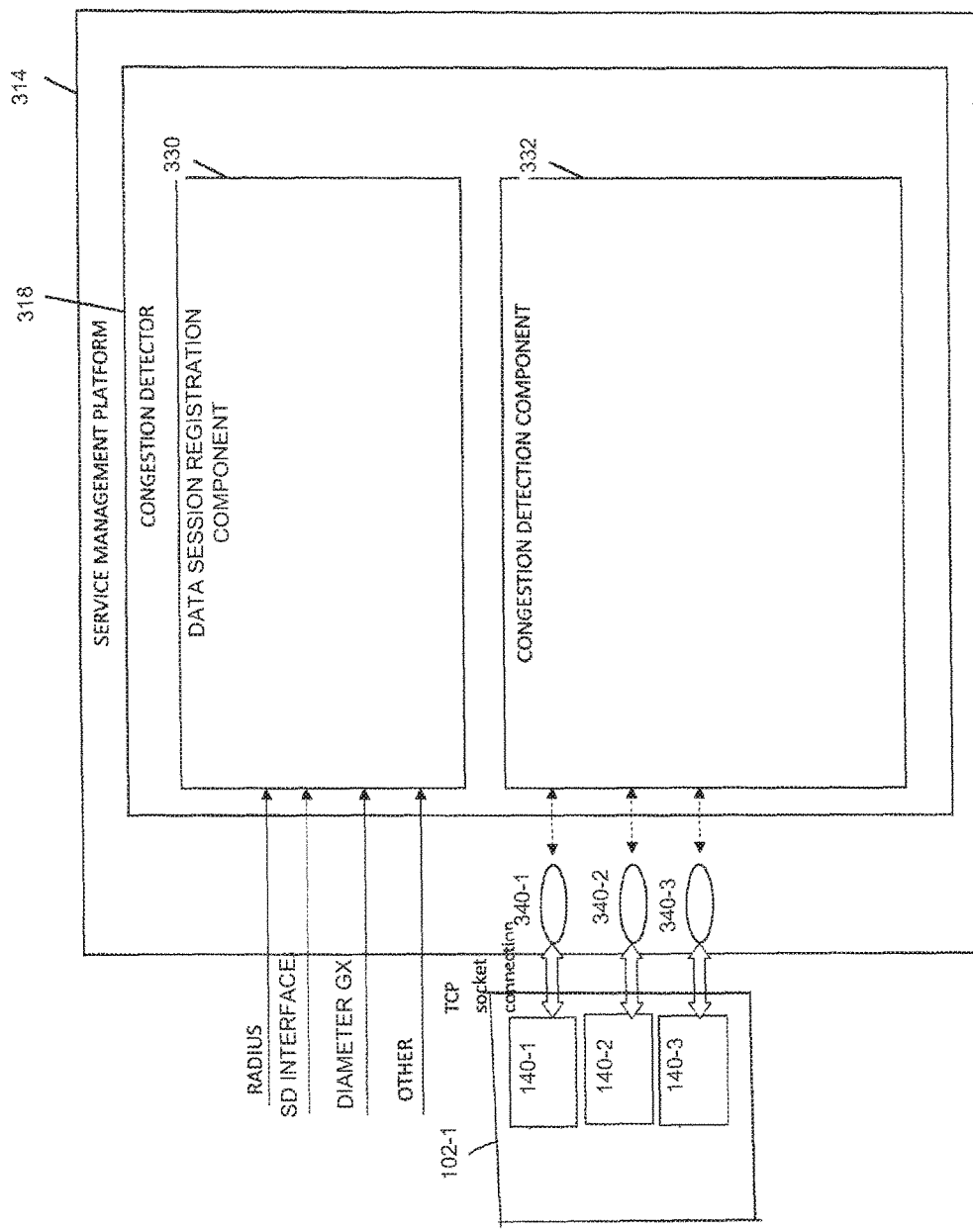
FIG. 3 is a schematic diagram showing a service management platform in accordance with a first embodiment.

FIG. 3 depicts an embodiment of the service management platform 114 of FIG. 1. In the embodiment depicted in FIG. 3, a service management platform 314 includes a congestion detector 318, which includes a data session registration component 330 and a congestion detection component 332. Although the congestion detector 318 is depicted and described with certain components and functionality, other embodiments of the congestion detector 318 may include fewer or more components to implement less or more functionality. In an embodiment, the congestion detector 318 includes multiple congestion detection components and each congestion detection component may be responsible for a subset of the wireless devices 102-1 . . . 102-N in the radio access network 110. In another embodiment, components of the congestion detector 318 are distributed among different devices in a network. For example, the data session registration component 330 and the congestion detection component 332 can be located in separate network devices, which may be located in the same network or different networks.

The data session registration component 330 of the congestion detector 318 is configured to detect and register data session between the wireless devices and the Internet. In an embodiment, the data session registration component receives a message from the radio access network 110 indicating that a wireless device has initiated a data session via the internet gateway 112. Typically, the message is received at the data session registration component 330 based on the Remote Authentication Dial-In User Service (RADIUS) protocol or similar (e.g. the Sd or Diameter Gx interfaces). In an embodiment, the notification includes a subscriber identifier for the subscriber associated with the wireless device (e.g. the International Mobile Subscriber Identity (IMSI)) and a network address (e.g. an IP address) assigned to the wireless device for the data session. Upon receipt of the message, the data session registration component 330 registers the data session with reference to the subscriber identifier and associated network address, and records or "marks" the data session as being uncongested.

The congestion detection component 332 of the congestion detector 318 is configured to detect congestion conditions in respect of a data session registered by the data session registration component 330. For example, congestion may be caused by hardware limitations of the wireless device, heavy data usage by the subscriber of the wireless device, heavy data usage for a particular radio access network cell, sub-optimal cellular coverage or adverse atmospheric conditions. In an embodiment, the congestion detection component 332 is configured to first determine whether a data session is a congested data session candidate, and then determine whether or not the congested data session candidate is a congested data session. In order to determine whether a data session is a congested data session candidate, the congestion detection component 332 is configured to monitor data flows associated with the data session and determines the bandwidth for each data flow. Once the bandwidth for each flow has been determined, the congestion detection component 332 calculates an average bandwidth for the data flows and compares the calculated average bandwidth to a threshold, referred to as a "lower threshold". The lower threshold may be set on a "global" basis for all subscribers monitored by the service management platform 314, or an "individual" basis whereby each subscriber monitored by the service management platform 314 is provided with a respective threshold. In some embodiments, the lower threshold may be determined, at least in part, based on the radio frequency (RF) communications protocol used for the data session (e.g. 3G or 4G) to account for bandwidth differences between protocols. When the average bandwidth associated with the data session is lower than or equal to the lower threshold set of the respective subscriber, the data session is determined as being slow. For example, if the average bandwidth associated with a data session is lower than or equal to 10 kilobytes per second, the data session is determined as being slow. A single determination that the data session is slow may not be enough to conclude that the data session is congested. Rather, the congestion detection component 332 registers or "marks" the data session as a congested data session candidate and continues to monitor bandwidth of data flows associated with the data session. By first denoting a data session as a congested data session candidate and then determining whether or not the congested data session candidate is actually congested based on monitoring over an extended period of time, data session congestion detection can be conducted more accurately.

The wireless devices 102-1 . . . 102-N can be dynamically registered or "marked" as congested data sessions by the data session registration component 330. In an embodiment, once a data session has been determined as being a congested data session candidate, the average bandwidth for data flows associated with the congested data session candidate is monitored for an extended monitoring period, referred to as a "monitoring window" (e.g. 60 seconds). When the average bandwidth for the data flows remains below the lower threshold for the duration of the monitoring window, the congested data session candidate is determined as being a congested data session and registered as such by the congestion detection component 332. Conversely, if the average bandwidth rises above the lower threshold during the monitoring window, the congested data session candidate is determined as not being congested and is removed from the list of congested data session candidates. In this manner, the congestion detection component 332 can build up a list of congested data session candidates and determine congested data sessions from the congested data session candidates so that data session congestion detection can be conducted more accurately.

In an embodiment, the bandwidth for a given data flow is determined based on transport layer information, such as TCP information. For example, the bandwidth can be determined by measuring a download data rate for the associated data flow. The download data rate for the data flow is the data rate at which data is transmitted from the service management platform 314 to the associated wireless device 102-1 . . . 102-N. The download data rate of a data flow can be measured using different approaches. In an embodiment, the download data rate of a data flow can be determined by measuring the time taken writing a specific amount of data to a client side socket buffer (e.g. a TCP socket buffer) in the wireless device 102-1 to calculate a buffer write rate to the client side socket buffer. In another embodiment, the download data rate of a data flow can be determined by measuring the time taken writing a specific amount of data to a server side socket buffer (e.g. a TCP socket buffer) in the service management platform 314 that corresponds to a client side socket buffer to calculate a buffer write rate to the server side socket buffer. Compared to calculating the buffer write rate to the client side socket buffer, calculating the buffer write rate to the server side socket buffer can be done more readily by the service management platform 314.

In the embodiment depicted in FIG. 3, the service management platform 314 includes one or more TCP socket buffers 340-1 . . . 340-K, where K is an integer. In the illustrated example, each of the TCP socket buffers 340-1 . . . 340-K in the service management platform 314 is connected to one of TCP socket buffers 140-1 . . . 140-K in one of the wireless devices 102-1 . . . 102-N via a TCP socket connection. The congestion detection component 332 is configured to measure a buffer write rate to a server side TCP socket buffer in the service management platform 314 that is associated with a data flow. The server buffer write rate for an active transaction can be measured in data written per unit time, such as bytes per second. The server buffer write rate may be measured at the socket application programming interface (API) level. Once the buffer write rate has been determined for each of the TCP socket buffers 340-1 . . . 340-K, an average can be calculated and the calculated average can be compared to the lower threshold to determine if the associated data session is a congested data session candidate, as discussed above.

In an exemplary operation of the service management platform 314, the data session registration component 330 identifies the data session (i.e. the mobile device in the radio access network 110) to which TCP socket buffer is associated. For example, the data session registration component obtains the IP address or subscriber identifier of the wireless device that is associated with the TCP socket buffer. The congestion detection component 332 determines the congestion condition of the data session based on the TCP socket buffers associated with the data session.

Once the service management platform 314 has determined that a data session is congested, it may take a number of actions to, for example, reduce congestion for the data session or gather data for analysis and reporting. For example, the service management platform 314 can apply a higher optimization/compression level to content that is being delivered to a subscriber associated with a congested data session in order to reduce the amount of data transmitted to the wireless device 102-1 . . . 102-N. The service management platform 314 can dynamically compress content being delivered to the wireless devices 102-1 . . . 102-N in real time to react to changes in congestion conditions for a data session. For example, the service management platform 314 can perform bit rate adjustment and/or format conversion to decrease the resolution and the data size of content if the content is being delivered in a congested data session. In addition, the service management platform 314 can collect congestion condition statistics for given subscribers over a time period for planning and marketing purposes. For example, the network operator can be made aware of which subscribers are congested over time, and target marketing at those subscribers to encourage them to upgrade their data plan or mobile device.

Figure 4:
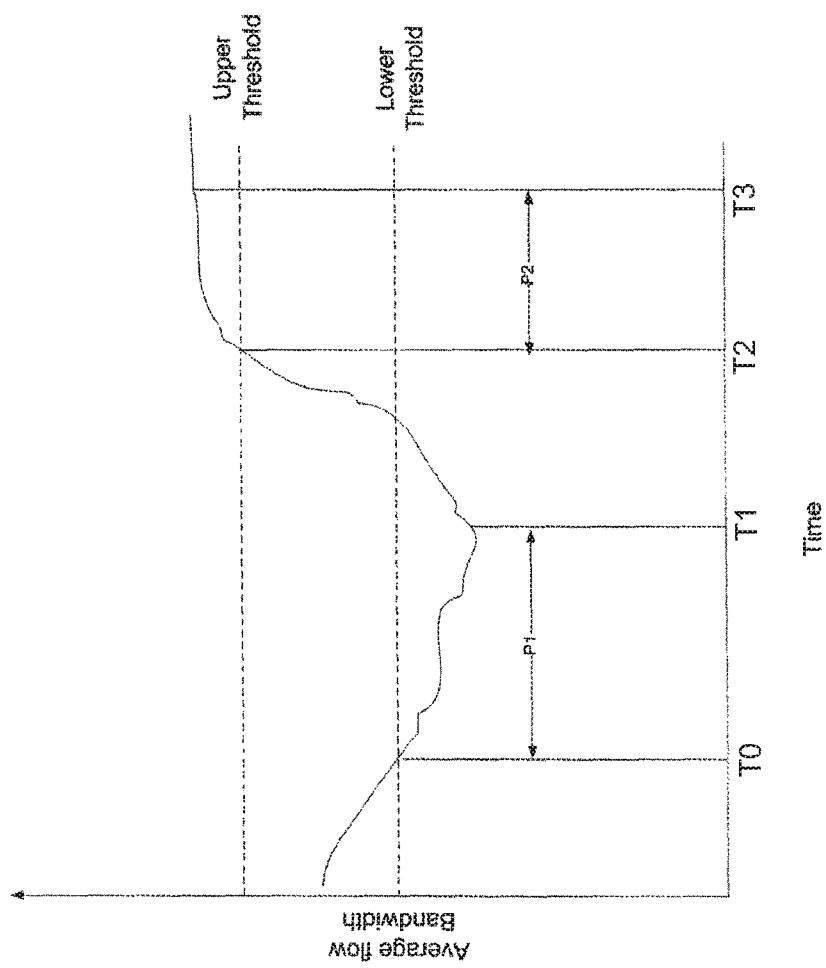
FIG. 4 is a graph showing average bandwidth of a plurality of data flows associated with a data session in accordance with an embodiment.

FIG. 4 shows a plot of average bandwidth for a plurality of data flows associated with a data session. At a time T0 the average bandwidth for the data session falls below a lower threshold and remains under this threshold for a period of P1 seconds until time T1. At time T1 the session is marked as congested and the service management platform may, for example, take measures to reduce congestion on the data session in accordance with a subscriber policy. After a later time T2 the average bandwidth for the data session increases above the upper threshold but the data session remains in the congested state. If the average bandwidth for the data session remains above the upper threshold for a time period of P2 second, the data session is removed from congestion list. In this manner, the use of the lower threshold and upper threshold provides a hysteresis effect which enables the congestion detection component 332 to "latch" the determined congestion state. This prevents rapid changes in the detected congestion state caused by short-term fluctuations in the determined average bandwidth for the plurality of data flows.

According to some embodiments, the thresholds employed by the congestion detection component 332 may be adjusted in response to detected events in respect of data session initiated by the wireless device (termed "mid-session events"). One example of such a mid-session event is a transition from a 3G to a 4G data session, in response to which the thresholds may be adjusted to reflect the higher data throughput rate possible in a 4G data session. Indications of a mid-session event may, for example, be received at the congestion detection component 332 from the internet gateway 112.

Figure 5:
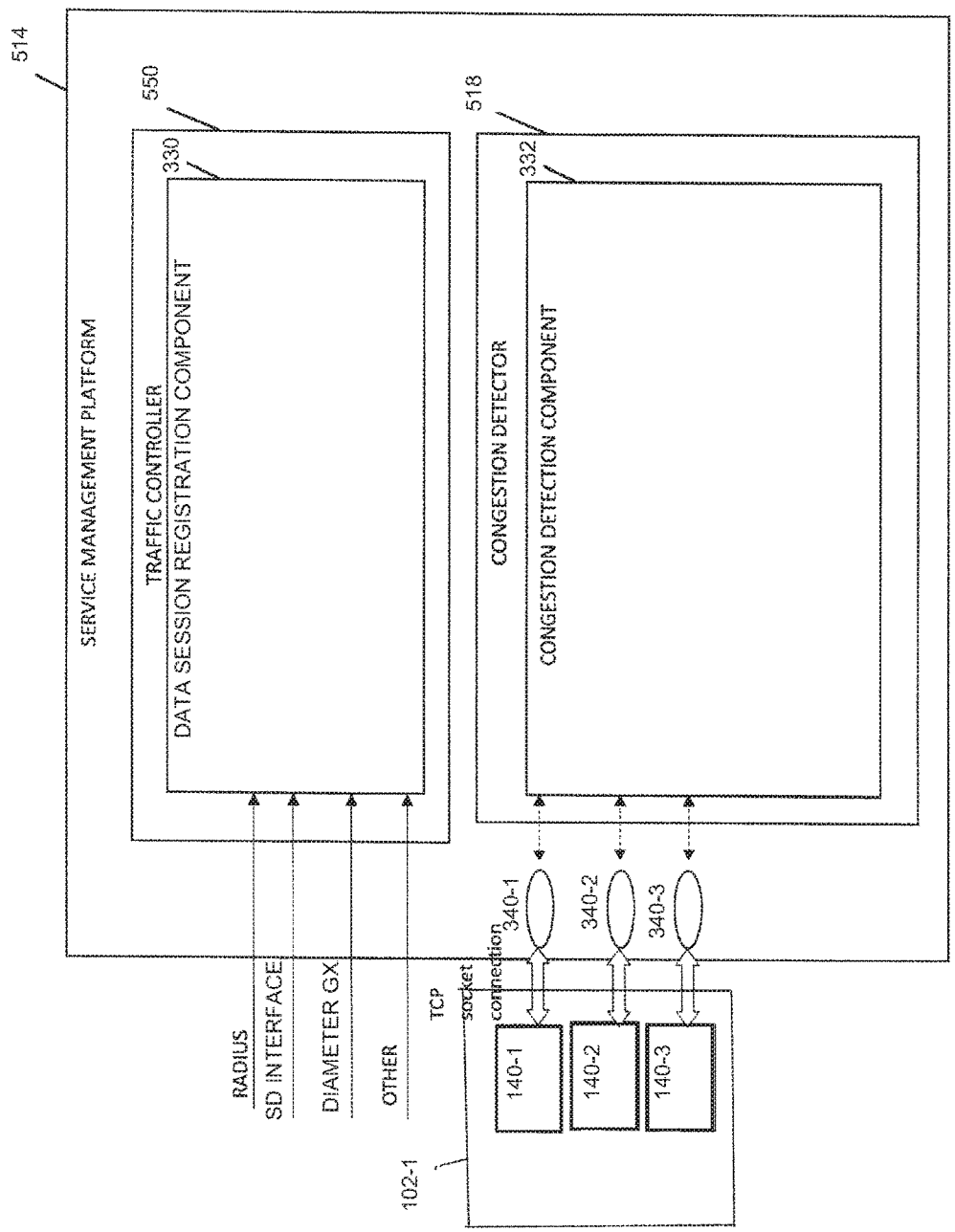
FIG. 5 is a schematic diagram showing a service management platform in accordance with a second embodiment.

In some embodiments, the data session registration component 330 is not part of the congestion detector 318. For example, the data session registration component 330 may be a part of a service component of the service management platform 114, 314. FIG. 5 depicts a further embodiment of a service management platform 514 that incorporates the data session registration component in a traffic controller 550. In the embodiment depicted in FIG. 5, the service management platform 514 includes the traffic controller 550, which itself includes the data session registration component 330, and a congestion detector 518, which includes the congestion detection component 332. The traffic controller is configured to handle communication traffic that goes through the service management platform 514. The congestion detector 518 performs similar functions to the congestion detector 318 of FIG. 3.

Figure 6:
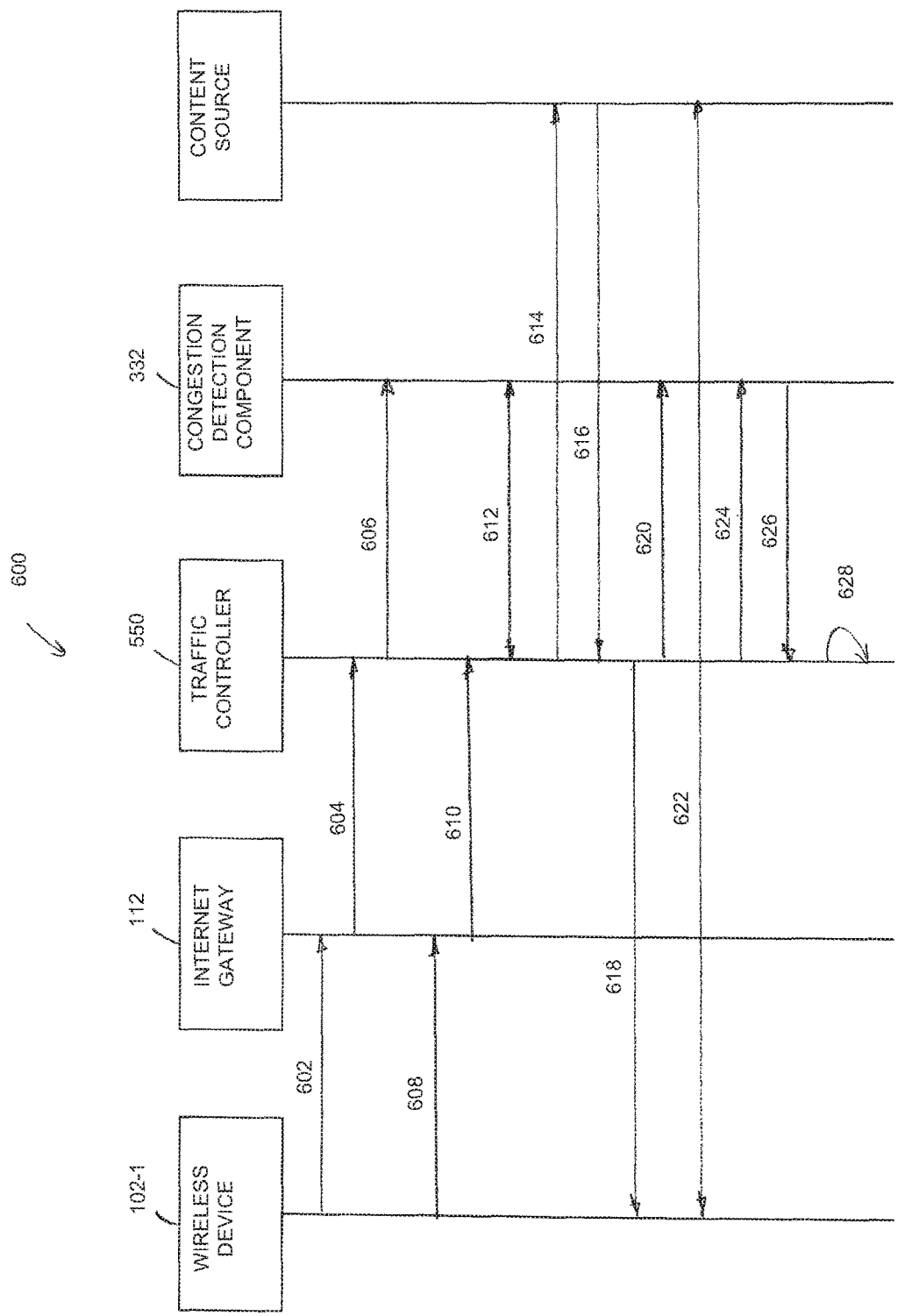
FIG. 6 is a signaling diagram showing a method of detecting congestion in a data session in accordance with a first embodiment.

FIG. 6 illustrates an exchange of messages associated with a method 600 of monitoring congestion in a data session, implemented by the service management platform 514 of FIG. 5. In the embodiment depicted in FIG. 6, a mobile device connects to the Internet gateway 112 and initiates a data session [message 602]. Upon initiation of the data session, the Internet gateway 112 sends a RADIUS message to the traffic controller 550 of the service management platform 514, including subscriber identifier and the IP address assigned to the wireless device by the Internet gateway 112 [message 604]. The data session registration component 330 of the traffic controller 550 registers the data session based on the information provided in the RADIUS message from the Internet gateway 112 and the IP address associated with the wireless device is sent to the congestion detection component 332 to initiate monitoring of data flows associated with the data session [message 606]. The congestion detection component 332 monitors data flows associated with the data session based on the received IP address to determine the average bandwidth for the data session. The wireless device sends an HTTP request to a content source 108 via the Internet gateway 112 [message 608] and the Internet gateway 112 sends the received request in a message to the service management platform [message 610]. Upon receipt of the HTTP request, the traffic controller 550 checks the congestion status for the data session by querying the congestion detection component 332 and determines that the data session is not congested [message 612]. Next, the traffic controller 550 forwards the HTTP request to the content source [message 614] and receives a response from the content source [message 616] which is written to TCP socket buffer and subsequently delivered to the wireless device [message 618]. The traffic controller 550 proceeds to determine the bandwidth of the data flow associated with the HTTP request by monitoring the volume of data written the TCP socket buffer and the time to write the data. The determined bandwidth for the data flow is sent to the congestion detection component 332 [message 620] and the congestion detection component 332 proceeds to calculate the average bandwidth of data flows associated with the data session. If the average bandwidth for the data is below the lower threshold the congestion detection component 332 identifies the data session as being a congested data session candidate. Next, the traffic controller 550 proceeds to monitor multiple data flows associated with the data session [message 622] and calculated bandwidths for the flows are fed to the congestion detection component 332 so that the average bandwidth for the data session can be updated

[message 624]. If the average bandwidth for the data session remains below the lower threshold for a predetermined time period, the congestion detection component 332 informs the traffic controller 550 that the data session is congested [message 626]. Based on the determination that the data session is congested, the traffic controller 550 determines a policy to be applied to subsequent data flows or transactions associated with the data session and applies the determined policy to subsequent responses received from the content source 108-1 . . . 108-L [message 628].

Figure 7:
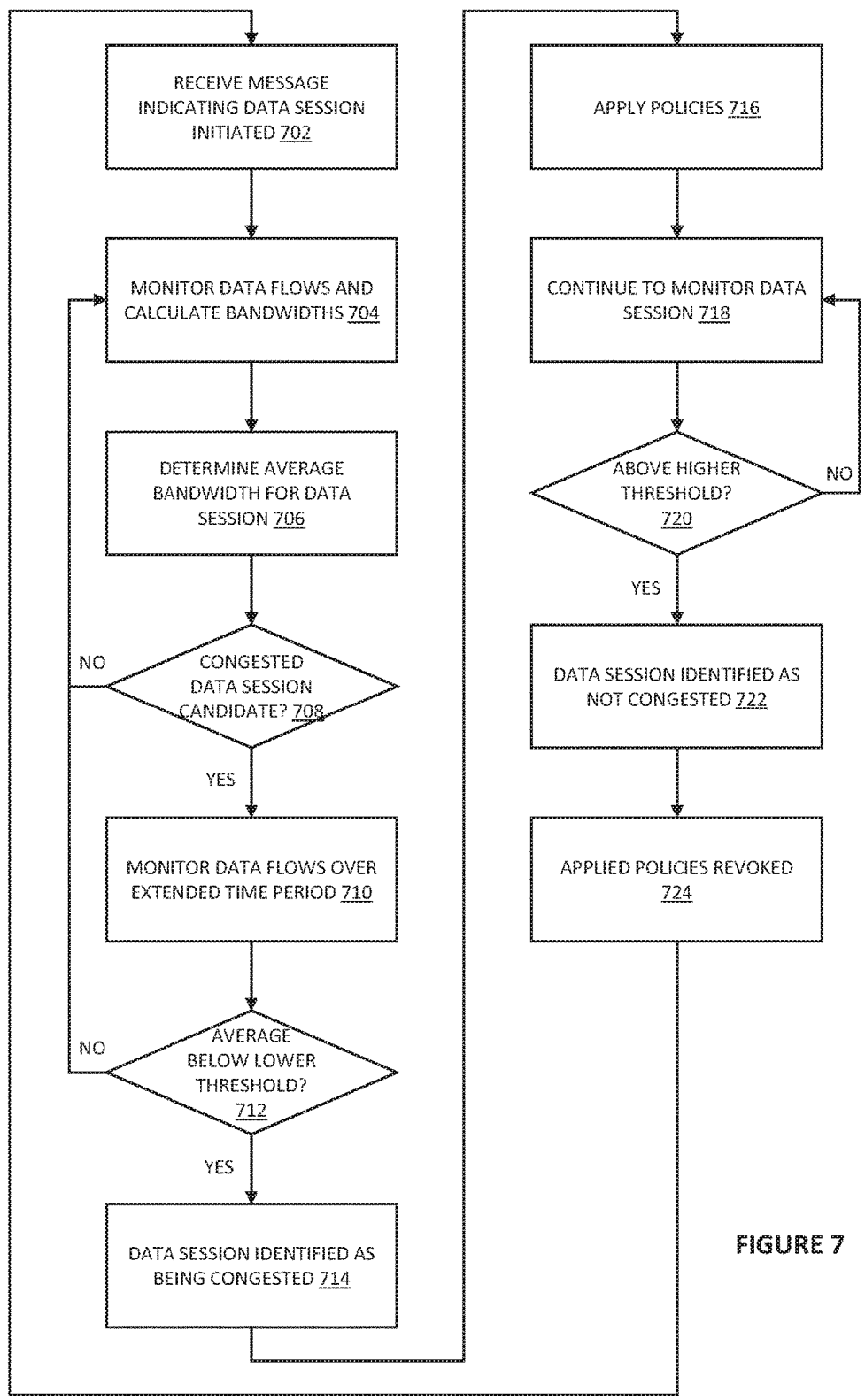
FIG. 7 is a flowchart showing a method of detecting congestion in a data session in accordance with a second embodiment.

A method 700 for congestion monitoring in a data network in accordance with an embodiment is shown in FIG. 7. First, the service management platform 114 receives a message from the Internet gateway 112 indicating that a wireless device 102 has initiated a data session [step 702]. In response receipt of the message, the service management platform 114 starts monitoring data flows associated with the data session to calculate their respective bandwidths [step 704]. Based on the calculated bandwidths, the service management platform 114 determines an average bandwidth for the data session [step 706] and compares the bandwidth to the lower threshold to determine if the data session is a congested data session candidate [step 708]. If the data session is determined as not being a congested data session candidate, the method returns to step 704. If the data session is determined as being a congested data session candidate the service management platform 114 continues to monitor the average bandwidth for the data session over an extended time period [step 710] and determines whether the average bandwidth remains below the lower threshold for a predetermined time period [step 712]. If the average bandwidth does not remain below the lower threshold for the predetermined time period, the method returns to step 704. If the average bandwidth remains below the lower threshold for the predetermined time period the data session is identified as being a congested data session [step 714] and one or more policies can be applied to subsequent data flows [step 716]. Once the data session has been determined as being congested, the service management platform 114 continues to monitor the average bandwidth for the data session [step 718]. If the average bandwidth rises above the upper threshold and remains above the upper threshold for a predetermined time period [step 720] the data session is identified as no longer being congested [step 722] and the one or more policies applied to the data session may be revoked or changes [step 724]. Otherwise, if the average bandwidth does not rise above the upper threshold and remain above the upper threshold for a predetermined time period, the method returns to the step 718.

Figure 8:
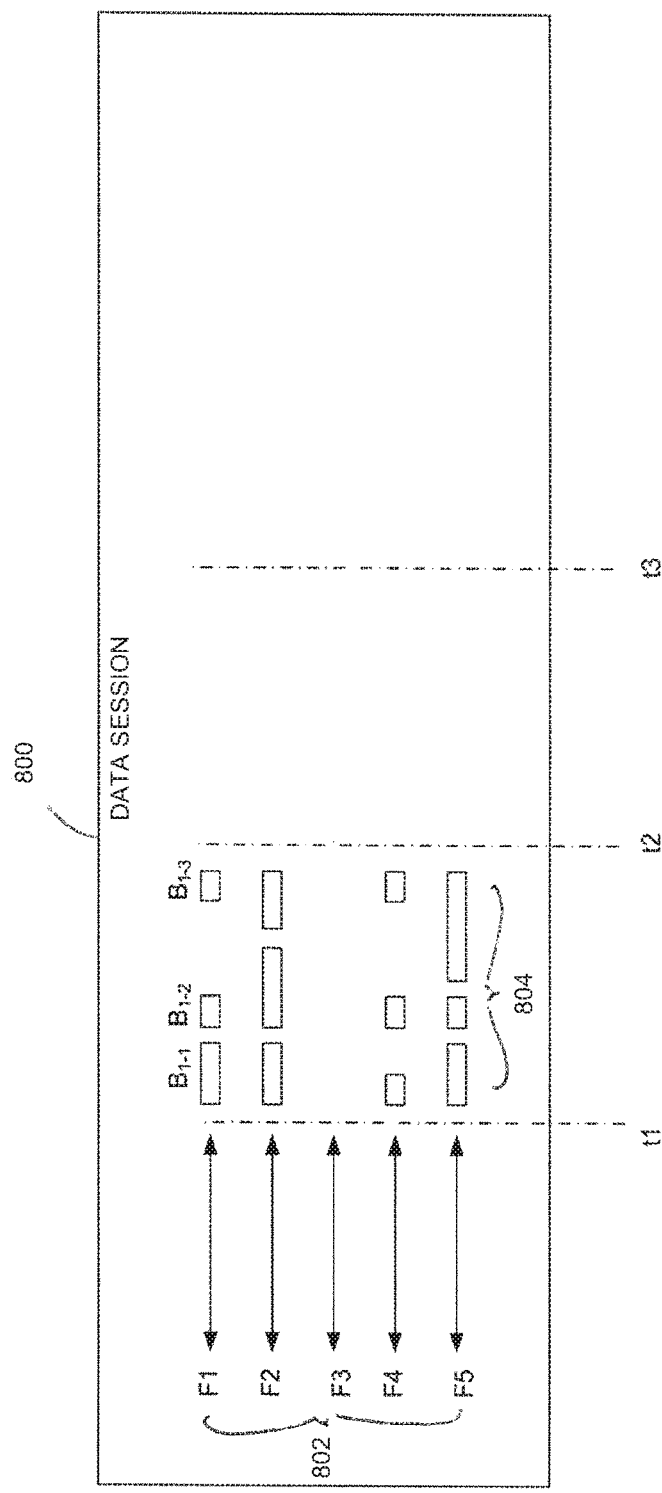
FIG. 8 is a timing diagram showing a data session comprising a plurality of data flows in accordance with an embodiment.

Calculation of the average bandwidth for a data session according to an embodiment, is discussed with reference to FIG. 8. FIG. 8 shows data session 800 comprising five concurrent data flows 802, labelled F1-F5. During a first time period between times t1 and t2, each of the data flows shows data activity 804 with the exception of data flow F3 which is inactive during the time period. For each data flow, the write rate is measured for each discrete period of data activity for the flow. For example, data flow F1 is associated with three "active" periods during the time period t1 to t2, with respective write rates B1-1, B1-2 and B1-3. Thus, in this example the bandwidth, F1t2-t1, for data flow F1 is approximated by taking the geometric average of data write rates B1-1, B1-2 and B1-3:

$$F1_{t2-t1} = \frac{B_{1-1} + B_{1-2} + B_{1-2}}{3}.$$

In contrast, data flow F3 is inactive for the period and the average bandwidth F3t2-t1 is calculated as zero. Once the bandwidth for each of the data flows F1-F5 has been calculated for the period, the average bandwidth for the data session (i.e. the plurality of data flows 802) during the period is calculated by taking the geometric average of the calculated flow bandwidths:

$$S_{t2-t1} = \frac{F1_{t2-t1} + F2_{t2-t1} + F4_{t2-t1} + F5_{t2-t1}}{5}.$$

FIG. 8 shows one example of the determination of the average bandwidth for the data session 800 and it will be understood that alternative measures of average bandwidth may be used in further embodiments. For example, further embodiments may employ a moving average for the calculation of average bandwidth, rather than the defined time periods of FIG. 8. Similarly, some embodiments may employ a weighted average to, for example, apply different weightings to different types of data flow. In this context, weighted averages may, for example, be employed where it is desired to give a greater precedence to particular types of data flow (e.g. streaming audio-visual data) which are relatively sensitive to congestion in the data session.

Although the operations herein are shown and described in a particular order, the order of the operations may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any transitory or non-transitory apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In an embodiment, at least one of the functionalities of components of the content delivery system 100, such as the service management platform 114, 314 or 514 and the congestion detector 118, 318 or 518, is performed by a computer that executes computer readable instructions. FIG. 9 depicts a computer 900 that includes a processor 902, memory 904, and a communications interface 906. The processor may include a multifunction processor and/or an application-specific processor. Examples of processors include, without limitation, the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for congestion monitoring in a data network, the method comprising:
   determining, at a server in the data network, that a user device has initiated a data session with the data network;
   monitoring, at the server, a plurality of data flows associated with the data session between the user device and the data network;
   determining an average bandwidth of the plurality of data flows associated with the data session between the user device and the data network; and
   determining a first congestion status of the data session based on the average bandwidth and one or more first criteria;
   wherein the one or more first criteria comprise a first threshold level and a first time period; and
   wherein the determining the first congestion status comprises:
      determining the data session as a congested data session candidate when the average bandwidth is below the first threshold; and
      determining the first congestion status as indicating that the data session is congested when the average bandwidth of the congested data session candidate remains below the first threshold level for longer than the first time period.

2. The method according to claim 1, wherein the data session is an Internet Protocol (IP) data session.

3. The method according to claim 1, wherein the server is a proxy server located in a data path between the user device and a plurality of content sources.

4. The method according to claim 3, wherein the plurality of data flows comprises a first data flow and a second data flow, the first data flow comprising first data transmitted between the user device and a first endpoint associated with the plurality of content sources, and the second data flow comprising second data transmitted between the user device and a second endpoint associated with the plurality of content sources.

5. The method according to claim 4, wherein the first data is transmitted using the Transmission Control Protocol (TCP), and the first endpoint is a first network socket associated with a first TCP connection over which the first data is transmitted.

6. The method according to claim 4, wherein the second data is transmitted using the Transmission Control Protocol (TCP), and the second endpoint is a network socket associated with a second TCP connection over which the second data is transmitted.

7. The method according to claim 4, wherein the first endpoint is associated with a first content source in the plurality of content sources, and the second endpoint is associated with a second content source in the plurality of content sources, different from the first content source.

8. The method according to claim 1, wherein the plurality of data flows comprises a first data flow and a second data flow, the first data flow comprising first data addressed to a first network socket associated with the user device, and the second data flow comprising second data addressed to a second network socket associated with the user device, wherein the first network socket is different from the second network socket.

9. The method according to claim 1, wherein the plurality of data flows is associated with a plurality of buffers and monitoring the plurality of data flows associated with the data session includes monitoring the rate at which data is written to each of the plurality of buffers.

10. The method according to claim 1, further comprising modifying a characteristic of at least one data flow in the plurality of data flows when the first congestion status determined for the data session indicates that the data session is congested.

11. The method according to claim 10, wherein the characteristic of the at least one data flow in the plurality of data flows is modified in accordance with a policy associated with the user device.

12. The method according to claim 11, wherein the policy is at least one of an access control policy and a rate shaping policy associated with the user device.

13. The method according to claim 10, wherein the characteristic of the at least one data flow in the plurality of data flows is modified by changing an optimisation process applied to the at least one data flow.

14. The method according to claim 10, wherein the characteristic of the at least one data flow in the plurality of data flows is modified by changing a traffic shaping process applied to the at least one data flow.

15. The method according to claim 1, wherein determining that a user device has initiated a data session with the data network is based, at least in part, on a message received at the server.

16. The method according to claim 15, wherein the message is a Remote Authentication Dial-In User Service (RADIUS) message received from an Authentication, Authorization, and Accounting (AAA) server.

17. The method according to claim 1, further comprising determining a second congestion status of the data session based on the average bandwidth and one or more second criteria, wherein the one or more second criteria comprise a second threshold level and a second time period, and the second congestion status determined for the data session indicates that the data session is no longer congested when the average bandwidth is above the second threshold level for longer than the second time period.

18. A system for congestion monitoring in a data network, the system comprising at least one memory including computer program code; and at least one processor in data communication with the at least one memory, wherein the at least one processor is configured to, at a server in the data network:
   determine that a user device has initiated a data session with the data network;
   monitor, at the server, a plurality of data flows associated with the data session between the user device and the data network;
   determine an average bandwidth of the plurality of data flows associated with the data session between the user device and the data network; and
   determine a first congestion status of the data session based on the average bandwidth and one or more first criteria
   wherein the one or more first criteria comprise a first threshold level and a first time period; and
   wherein the determination of the first congestion status includes the at least one processor configured to:
     determine the data session as a congested data session candidate when the average bandwidth is below the first threshold; and
     determine the first congestion status as indicating that the data session is congested when the average bandwidth of the congested data session candidate remains below the first threshold level for longer than the first time period.

19. A non-transitory computer-readable storage medium comprising computer-executable instructions which, when executed by a processor, cause a computing device to perform a method of congestion monitoring in a data network, the method comprising:
   determining, at a server in the data network, that a user device has initiated a data session with the data network;
   monitoring, at the server, a plurality of data flows associated with the data session between the user device and the data network;
   determining an average bandwidth of the plurality of data flows associated with the data session between the user device and the data network; and
   determining a first congestion status of the data session based on the average bandwidth and one or more first criteria;
   wherein the one or more first criteria comprise a first threshold level and a first time period; and
   wherein the determining the first congestion status comprises:
   determining the data session as a congested data session candidate when the average bandwidth is below the first threshold; and
   determining the first congestion status as indicating that the data session is congested when the average bandwidth of the congested data session candidate remains below the first threshold level for longer than the first time period.

* * * * *